Figure 1:
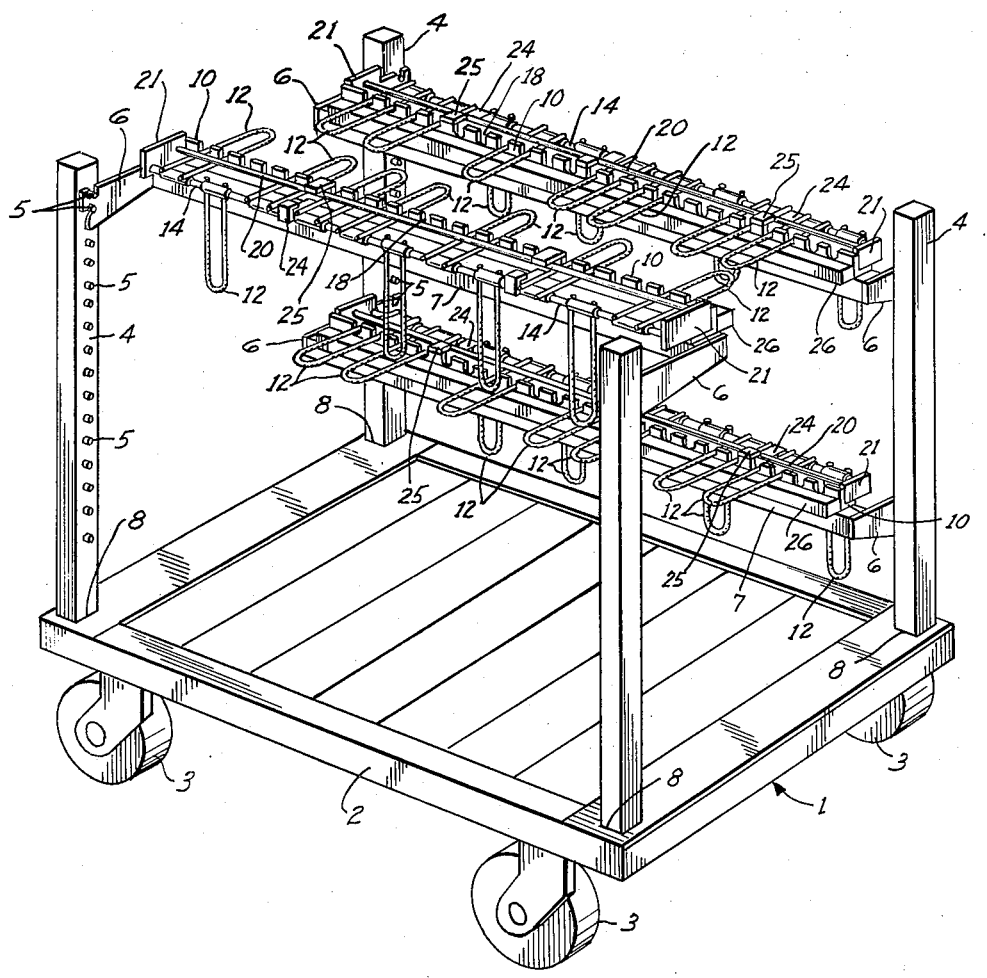

Jan. 3, 1961 R. J. DUFFNER 2,966,991
RACK FOR HOLDING MANUFACTURED PARTS SEPARATED DURING TRANSFER
Filed Jan. 29, 1958 2 Sheets-Sheet 1

INVENTOR.
Robert J. Duffner,
BY John H. Leonard,
his ATTORNEY.

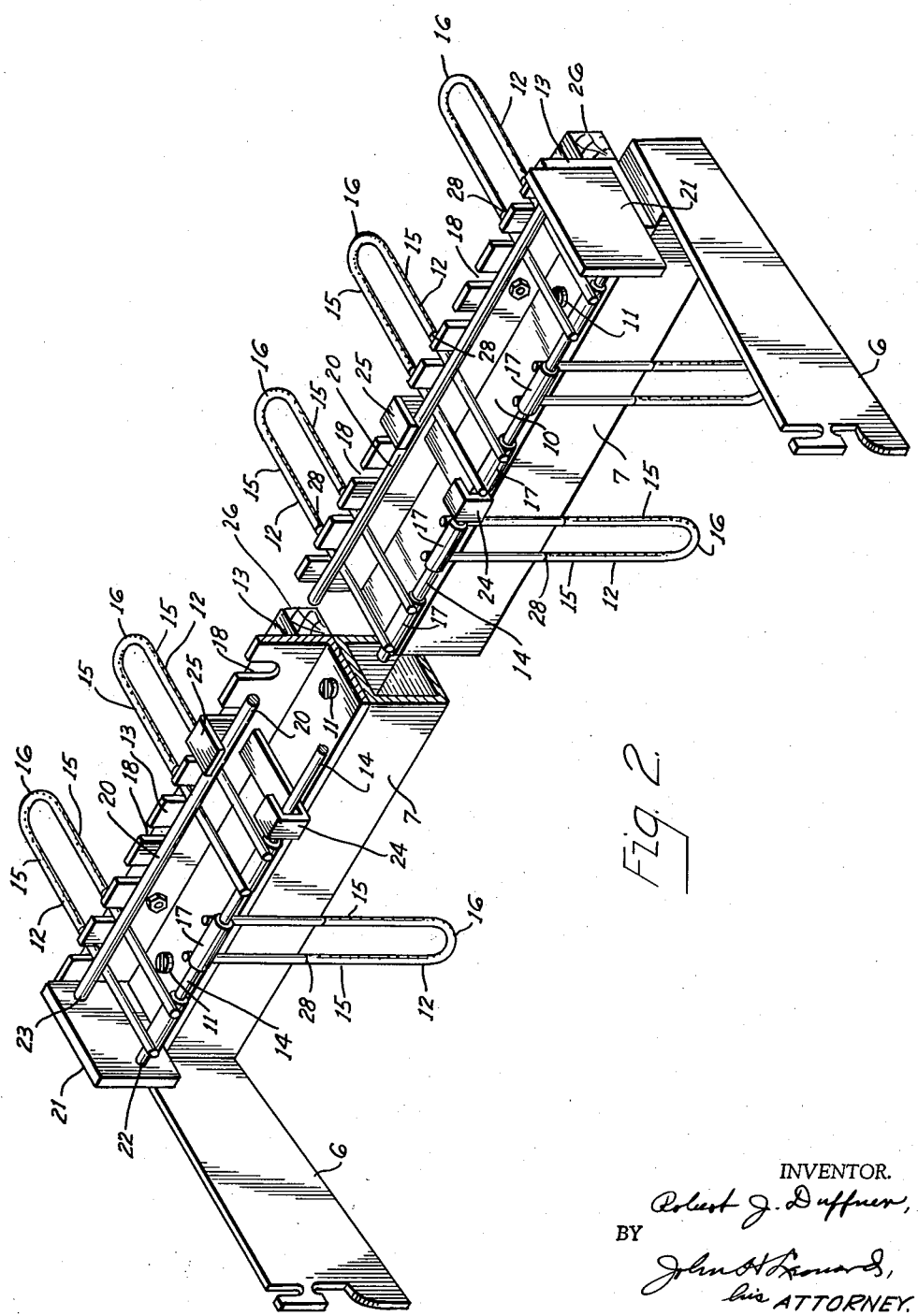

United States Patent Office 2,966,991
Patented Jan. 3, 1961

2,966,991

RACK FOR HOLDING MANUFACTURED PARTS SEPARATED DURING TRANSFER

Robert J. Duffner, Cleveland Heights, Ohio, assignor to The Lift-All Leasing Corporation, Cleveland, Ohio, a corporation of Ohio Filed Jan. 29, 1958, Ser. No. 711,948

9 Claims. (Cl. 211—60)

This invention relates to separator racks for holding manufactured parts separated from each other during the transfer thereof on dolly trucks between worksites.

In the manufacture of metal products, the customary practice is to load partially processed parts at one machine site onto dolly trucks and transport them thereon to another worksite for further processing. Generally, these trucks are provided with racks which are arranged to engage the parts so as to hold them separated from each other during the transportation so as to prevent scuffing and marring of their surfaces, bending, twisting, and the like, and, in the case of painted parts, damage to the surface coating.

Heretofore, for this purpose, the custom has been to provide wooden racks made especially for the particular parts, these racks being disposed of, or used as scrap or dunnage, or stored on the possibility that they might be used again for additional like parts in the future, after they have served their immediate purpose.

Such racks are expensive from the standpoint of the time and space required for their construction, and the storage of supplies therefor, and also from the standpoint of space for storage of the racks themselves against the contingency of their possible future use. Quite generally the racks are totally useless for any article other than the specific article for which they were originally produced.

One of the principal objects of the present invention is to provide racks suitable for fastening onto the conventional dolly trucks used for transporting partially finished articles from one work site to another in factories, and which contain a plurality of individually adjustable fingers which may be moved into and out of operating position, thus providing spaces of adjustable width therebetween, whereby the same racks can be made operative with respect to a large number of different sizes and shapes of articles.

Another object of the invention is to provide a rack for the purposes described which is extremely simple in construction and rugged in structure, and which may be produced very economically.

Another object is to provide a rack of this character made primarily of metal but which is so arranged that the article engaging surfaces thereof are non-metallic and can engage the surface of the articles supported and spaced thereby without scuffing or marring the surfaces.

Other objects and advantages will become apparent from the following description wherein reference is made to drawings illustrating a preferred embodiment of the invention, in which:

Fig. 1 is a perspective view of a dolly truck with a plurality of the racks of the present invention mounted thereon; and Fig. 2 is an enlarged perspective view illustrating one of the racks mounted on one of the conventional detachable supports of the dolly truck.

Referring to the drawings, the dolly truck, indicated generally at 1, has the conventional floor 2 and dolly wheels 3, with upright corner posts 4. Each of the corner posts is provided with a plurality of slot and pin connector portions 5 of conventional saber or blade connections, and these portions are arranged to receive detachably complementary saber or blade connector portions 6 of rails 7 for supporting the rails 7 in adjusted positions on the posts.

The posts may be detachably connected to the dolly truck. For example, they may be receivable in suitable openings 8 so that they can be faced in proper directions to permit the saber connections to secure the racks transversely and endwise of the dolly, selectively. The structure of the dolly truck 1 and its supporting rails 7 are conventional structures with which the present invention is to be used.

The present invention comprises a plurality of racks, each of which is adapted to be secured in fixed position on one of the detachable rails 7. Referring to Fig. 2, the rack comprises an elongated support 10 which, in the form illustrated, is shown as an angle iron arranged with one arm or flange horizontal and one vertical, and with the outer face of the horizontal flange disposed in juxtaposition with the top face of the rail 7. The support 10 is connected to the rail 7 by means of suitable bolts 11.

Mounted on the support 10 are a plurality of fingers 12 which are arranged in laterally spaced relation to each other in a row which extends endwise of the support 10. The fingers are connected by suitable connecting means to the support 10 for movement transversely thereof independently of each other to active positions and idle positions, selectively. This transverse movement is effected in the illustrative example by a connecting means in the form of a pivot connection between the support 10 and the fingers 12. In its active position, each finger extends outwardly beyond the outer face of the upright flange or arm which forms the side wall 13 of the support 10. In their active positions, adjacent fingers can engage an article and constrain it from falling endwise of the row of fingers or support.

As mentioned, it is one feature of the present invention to provide a structure which is relatively simple and rugged for this particular purpose. Accordingly, for mounting the fingers 12 for movement from their active operative position to their idle positions, each finger 12 is mounted for swinging about a pivotal axis extending endwise of the support 10. Preferably all fingers 12 are mounted on a common pivot rod 14 which comprises a single length of rod extending the length of the support 10. The fingers may be in the form of U-shaped wickets, each having a pair of leg portions 15 which are joined at their outer ends 16 by a curved intermediate portion. At their inner ends, each finger is connected to a sleeve 17 which loosely fits the rod 14 so as to mount the finger thereon for swinging upwardly and forwardly of the support 10 to an active position, and upwardly and rearwardly and thence downwardly and rearwardly of the support 10 to an idle position.

In Fig. 2, the finger at the extreme left is shown in its active position, and the finger adjacent to it at the right is in its idle position.

The side wall 13 of the support 10 is provided with finger spacing means in the form of notches 18 arranged in a row extending endwise of the support. Each notch opens upwardly and is of a sufficient width to receive one of the leg portions of a finger 12 when the finger is swung forwardly and downwardly about the axis of the pivot rod 14 to active position. Generally the depths of the notches 18 are such that when the fingers 12 are in active positions, the leg portions 15 rest in the bottom of the notches and the fingers are substantially horizontal, providing the racks themselves are in the horizontal position illustrated in Fig. 1.

The sleeves 17 are of such length as to afford relative independent movement of the fingers lengthwise of the pivot rod 14. For this purpose, the adjacent ends of adjacent sleeves of adjacent fingers, when the adjacent leg portions 15 are in adjacent notches, are spaced from each other endwise of the rod 14. The distance between the adjacent legs 15 of two adjacent fingers preferably is equal to the spacing apart of two adjacent notches.

Thus the fingers 12 may be moved different distances apart in increments equal to the spacing of the notches 18, and the notches 18 are located sufficiently closely so that the spaces between the fingers can be provided which will loosely fit substantially any article which it may be desired to support by the racks.

A distinct advantage, therefore, resides in providing for endwise adjustability of the fingers, and this is particularly true as the number of, and close spacing of, the notches increases.

Generally, the racks are used in the horizontal position illustrated in Fig. 2, in which case the fingers remain in their proper active or idle positions due to gravity. However, it is desirable that the fingers be latched in their active positions to prevent accidental displacement, and, for this purpose, a latching bar 20 is provided and is so arranged that it can be snapped into place and will press down firmly against the upper faces of the active fingers at a location just to the rear of the side face or wall portion 13 of the support 10.

In order to detachably support the latching bar 20 and pivot rod 14 on the support 10, the ends of the support 10 are provided with suitable blocks 21 each of which has a socket 22 for the pivot rod 14 and a socket 23 for the latching bar 20. These sockets are relatively shallow and do not extend through the blocks and, accordingly, the rod 14 and bar 20 are inserted in their respective sockets by bowing them laterally and then aligning their ends with the sockets and allowing them to return to their normal unbowed condition.

Suitable stops, such as indicated at 24, may be provided on the support for holding the rod 14 against lateral bowing after it is installed. Furthermore, there is provided on the support at spaced intervals some stops 25 which are arranged to bear against the upper surface of the bar 20 and hold it down firmly against the fingers 15 when the bar 20 is inserted in sockets 23.

For purposes of protecting the stock from scuffing and the like, the side wall 13 of the support 10 is provided with a wooden scuff board 26. Also, the outer ends and portions of the legs 15 of the fingers 12, which are exposed outwardly beyond the outer face of the scuff board 26 when the fingers are in active position, are coated with suitable resilient protective coating which extends from the outer end of the arms partway back on the leg 15 beyond or at least to the outer face of the scuff board 26, as indicated at 28 and by the shaded outer areas on the outer ends of the fingers. This material is preferably a polyvinyl chloride as it is relatively soft and resilient and tough and yet will well protect the parts from scuffing. Other plastics may be used depending upon the use to which the racks are to be put and the various materials which may come into contact with them and deleteriously affect them.

While, for purposes of illustration, I have shown a preferred embodiment of my invention which is relatively inexpensive and rugged, it is to be understood that the invention is not to be limited to the specific form shown.

Having thus described my invention, I claim:

1. A separator rack for holding manufactured parts separated from each other during the transfer thereof between worksites, comprising an elongated support having a side wall with a row of notches therein opening upwardly and spaced from each other endwise of the wall, a plurality of fingers, connecting means on the support, cooperable connecting means on the fingers, respectively, and connected to the connecting means on the support and thereby connecting the fingers to the support in a row extending endwise of the side wall and connecting each finger to the support for movement independently of the others transversely of the row from idle to active position in which the fingers are received in selected ones of the notches with the outer end portions of the fingers extending outwardly beyond said side wall of the support so that they can engage a workpiece and constrain it from falling, and to idle positions in which said fingers are withdrawn from said notches and the outer end portions of the fingers are withdrawn from said active positions, said fingers being disposed transversely of the row and being spaced from each other longitudinally of the row, each of said cooperable connecting means on the fingers being connected to the connecting means on the support for limited movement endwise of the row relative to the support independently of the others, so that each finger can be received in different preselected notches, respectively.

2. A separator rack for holding manufactured parts separated from each other during the transfer thereof between worksites, comprising an elongated support having a side wall with a row of notches therein opening upwardly and spaced from each other endwise of the wall, a plurality of fingers, connecting means on the support, cooperable connecting means on the fingers, respectively, and connected to the connecting means on the support, and thereby connecting the fingers to the support in a row extending endwise of the side wall and connecting each finger to the support for movement independently of the others transversely of the row from idle to active positions in which the fingers are received in selected ones of the notches with the outer end portions of the fingers extending outwardly beyond said side wall of the support so that they engage a workpiece and constrain it from falling, and to idle positions in which said fingers are withdrawn from said notches and the outer end portions of the fingers are withdrawn from said active positions, said fingers being disposed transversely of the row and being spaced from each other longitudinally of the row, each of said cooperable connecting means on the fingers being connected to the connecting means on the support for limited movement endwise of the row relative to the support independently of the others, so that each finger can be received in different preselected notches, selectively.

3. A rack according to claim 1 characterized in that latch means are provided on the support for latching the fingers in their selected notches, and said latch means includes a single latch bar common to all of said fingers.

4. A rack according to claim 3 characterized in that said latch bar is of relatively stiff flexible material and extends endwise of the support, and cooperating sockets are provided at the ends of the support and are adapted to receive the ends of the bar axially, the spacing of the sockets being related to the length of the bar so that, by bowing the bar laterally of the support, it can be shortened in overall dimension endwise of the support to a dimension less than the spacing of the sockets and moved into alignment with the sockets and then released, whereby, upon return of the bar to unbowed condition, its ends enter the sockets and said sockets are positioned so that, when the bar is installed therein, it engages the active fingers and constrains them from movement out of their active positions, respectively.

5. A rack according to claim 1 characterized in that the connecting means on the support and cooperable connecting means on the fingers pivotally connect the fingers on the support for swinging about their pivotal axes, and said rack further including a latch bar of relatively stiff material movable into juxtaposition with the sides of the fingers when they are in their active position and constraining them from swinging about their pivotal axes, and means for detachably holding the bar in latching position.

6. A rack according to claim 5 characterized in that a hold-down means is provided on the support and detachably engages the latch bar and holds it firmly in said juxtaposition.

7. A rack according to claim 1 characterized in that the connecting means on the support includes a single rod common to all of the cooperable connecting means on the fingers and said single rod extends endwise of the support, and the cooperable connecting means on the fingers are connected to said single rod for rotational movement about the axis of the rod and for linear movement endwise of the rod independently of each other.

8. A rack according to claim 1 characterized in that the connecting means on the support includes a single rod of relatively stiff flexible material which extends longitudinally of the support, and cooperating sockets at the ends of the support adapted to receive the ends of the rod axially, and the spacing of the sockets is related to the length of the rod so that, by bowing the rod laterally of the support, it can be shortened in overall dimension longitudinally of the support to a dimension less than the spacing of the sockets and moved into alignment therewith and released, whereby, upon return of the rod to unbowed condition, its ends enter the sockets.

9. A rack according to claim 1 wherein each of said fingers is in the form of a U-shaped wicket having a pair of leg portions joined at their outer ends by a curved intermediate portion, and the spacing of the notches is the same as the spacing of the leg portions.

References Cited in the file of this patent

UNITED STATES PATENTS

| | | |
|---|---|---|
| 471,474 | Freeman | Mar. 22, 1892 |
| 692,274 | Gumaer | Feb. 4, 1902 |
| 1,758,307 | Bales | May 13, 1930 |
| 1,954,711 | Mayer | Apr. 19, 1932 |
| 2,102,966 | Nash | Dec. 21, 1937 |
| 2,141,097 | Umphres | Dec. 20, 1938 |
| 2,639,815 | Paluck | May 26, 1953 |
| 2,884,221 | Messier | Apr. 28, 1959 |